US009996366B2

(12) United States Patent
Tammineni et al.

(10) Patent No.: US 9,996,366 B2
(45) Date of Patent: Jun. 12, 2018

(54) METHOD AND SYSTEM FOR AN INTERACTIVE USER INTERFACE TO DYNAMICALLY VALIDATE APPLICATION PROGRAM INTERFACE MODIFICATION REQUESTS

(71) Applicants: Bhavana Tammineni, Bellevue, WA (US); Shobhit Agrawal, Bothell, WA (US)

(72) Inventors: Bhavana Tammineni, Bellevue, WA (US); Shobhit Agrawal, Bothell, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days. days.

(21) Appl. No.: 15/208,442

(22) Filed: Jul. 12, 2016

(65) Prior Publication Data
US 2018/0018186 A1 Jan. 18, 2018

(51) Int. Cl.
  *G06F 9/44* (2018.01)
  *G06F 3/0484* (2013.01)
  *G06F 11/36* (2006.01)
(52) U.S. Cl.
  CPC .......... *G06F 9/4443* (2013.01); *G06F 3/0484* (2013.01); *G06F 11/3668* (2013.01)

(58) Field of Classification Search
  None
  See application file for complete search history.

(56) References Cited

U.S. PATENT DOCUMENTS 7,487,515 B1*  2/2009  Jones .................. G06F 17/2247
                                                      715/239
2015/0363171 A1* 12/2015 Esfahany ............ G06F 9/45504
                                                      717/106

* cited by examiner

*Primary Examiner* — Syed Roni
(74) *Attorney, Agent, or Firm* — Loeb & Loeb LLP

(57) ABSTRACT

A user interface for dynamically validating at least a portion of programming codes as an application program interface (API) modification request. A first window area statically displays data definitions for one or more configurable elements for a request to be operably connected to an API. A second window area displays programming codes structured according to the data definitions for the request. The second window area also receives a first input from a user to modify the configurable elements. In response to receiving the first input, a dynamic request display area receives an instruction from the user to submit the programming codes to the API for validation. The submitted programming codes are not complete as a complete transaction request for processing by the API. The dynamic request display area displays a response substantially immediate after the programming codes are submitted, and response indicates whether the submitted programming codes are valid.

20 Claims, 8 Drawing Sheets

FIG. 1
PRIOR ART

PRIOR ART

FIG. 2

Authentication

All calls to the Authorize.Net API require merchant authentication. Sign up for a sandbox account to get started quickly.

[Fields] [Try It] [Sandbox Credentials] [API Endpoints]

Request: [JSON] [XML]

```
1  <authenticateTestRequest xmlns="AnetApi/xml/v1/schema/AnetApiSchema.xsd">
2      <merchantAuthentication>
3          <name>API_LOGIN_ID</name>
4          <transactionKey>API_TRANSACTION_KEY</transactionKey>
5      </merchantAuthentication>
6  </authenticateTestRequest>
7
```

352

[SEND] [Reset]

Response:
```
1  <?xml version="1.0" encoding="utf-8"?>
2  <authenticateTestResponse xmlns:xsi="http://www.w3.org/2001/XMLSchema-inst
3      <messages>
4          <resultCode>Ok</resultCode>
5          <message>
6              <code>I00001</code>
7              <text>Successful.</text>
8          </message>
9      </messages>
10 </authenticateTestResponse>
11
```

354

PRIOR ART

FIG. 3A                                    350

| DOCUMENTATION | | // BODY |
|---|---|---|
| PAYMENT SCHEMA — 314 | | { |
| - PAYMENT API | CURRENCY<br>STRING = CURRENCY<br>USED FOR THE<br>TRANSACTION | "AMOUNT": "20.99"  — 312<br>"CURRENCY": "USD"  — 312<br>"PAYMENT": |
| AUTHORIZATION | PAYMENT: | {"CARDNUMBER": "4234090430233320,<br>"CARDEXPIRATIONMONTH": "10", — 312 |
| RETRIEVE PAYMENT<br>AUTHORIZATION | CARDNUMBER<br>STRING = CREDIT CARD<br>NUMBER | "CARDEXPIRATIONYEAR": "2017", — 312<br>"CODE": 132 — 312<br>} |
| CAPTURE FUNDS | CARDEXPIRATIONMONTH<br>STRING = TWO DIGIT<br>EXPIRATION MONTH | } |
| SEARCH FOR SALES | | |
| VOID A SALE | CARDEXPIRATIONYEAR<br>STRING = FOUR DIGIT<br>EXPIRATION YEAR | |
| VOID A CAPTURE | | [SEND REQUEST]  [RESET]<br>       308           310 |
| ISSUE A REFUND | CARDTYPE<br>STRING = CARDTYPE | // GENERATED RESPONSE |
| VOID A REFUND | | SUCCESS   306 |
| ...  302a | ...  302b | |

FIG. 3B

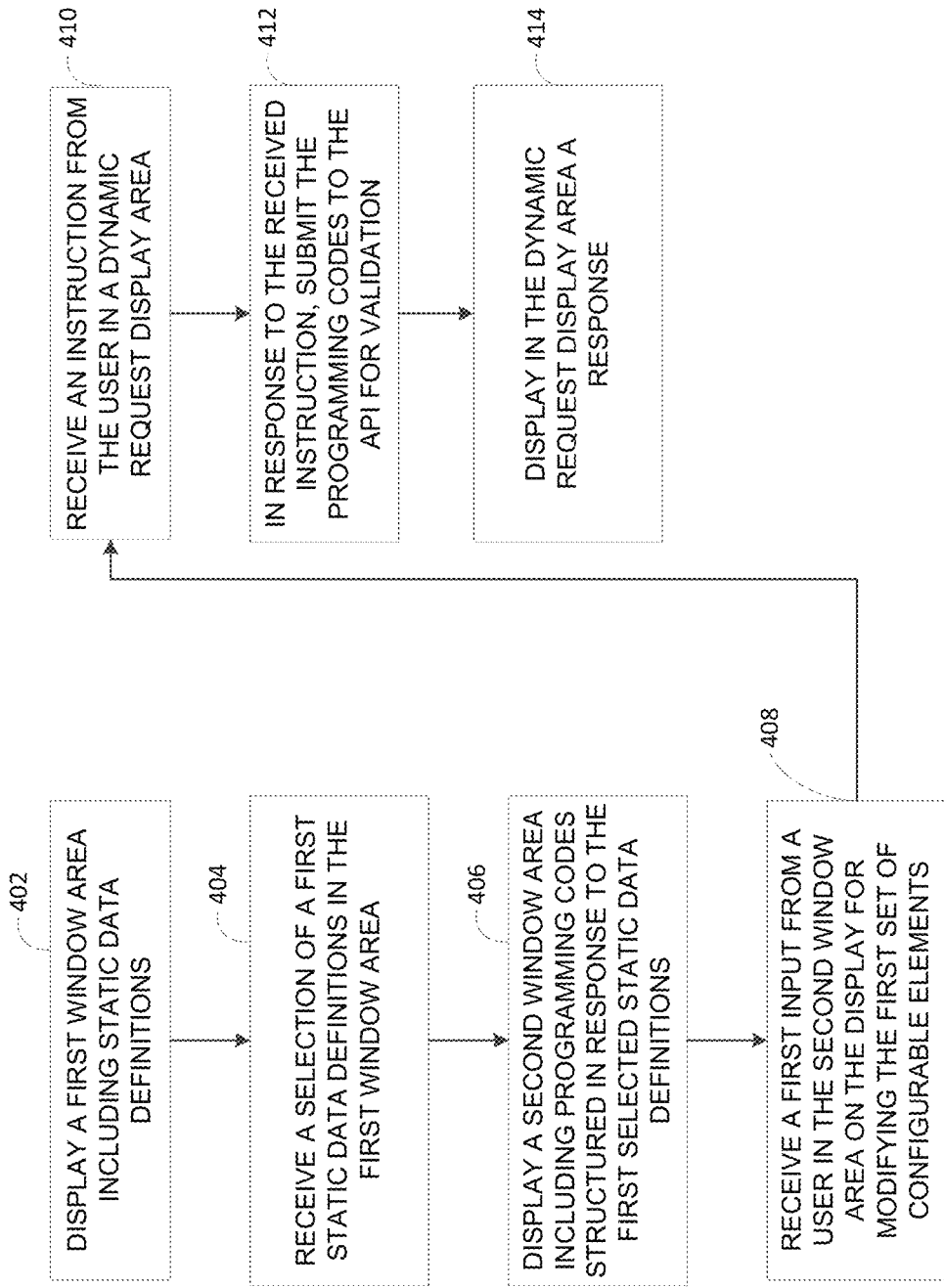

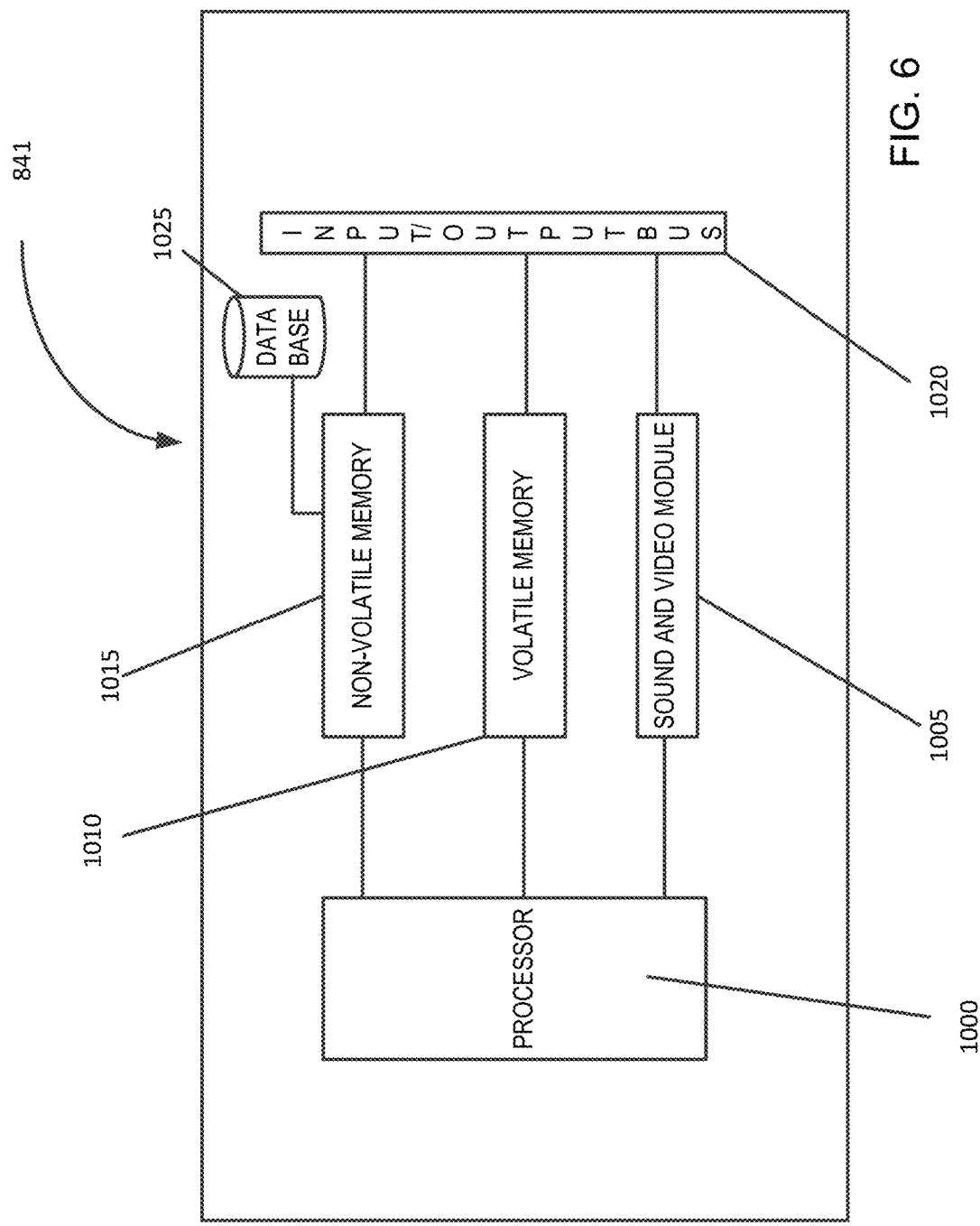

METHOD AND SYSTEM FOR AN INTERACTIVE USER INTERFACE TO DYNAMICALLY VALIDATE APPLICATION PROGRAM INTERFACE MODIFICATION REQUESTS

FIELD OF INVENTION

This invention generally relates to data element validation. Particularly, aspects of the invention relate to dynamically validating partially completed data elements for application programming interfaces (APIs).

BACKGROUND

In modern software designs, interconnectivities with various data or service providers are important, if not a critical aspect. With the convenience and openness of the Internet, software program products can no longer be operable without extensive connectivity with other devices or programs. At the programming level, software program products communicate with one another via application program interfaces (APIs) to properly and, sometimes securely, exchange data between different software program products. Software developers sometimes create special tools or "plug-ins" to leverage data communicated via the APIs to provide special features to the user. These tools or "plug-ins" usually need to create transaction requests to the APIs that are accepted by the APIs in order to fully leverage the functionality of the APIs.

Consequently, APIs designers frequently publish manuals, papers, tutorials describing structures of the APIs. For example, the APIs manuals, papers, or tutorials such as the ones shown in FIGS. 1 and 2 typically list the names of specific properties that are accepted by the APIs in one column or one side 202 while showing an example on the other side 204. Similarly, FIG. 2 shows another kind of API tutorial in windows 202 and 204 describing how a developer would create a properly configured requests or programming instructions to the APIs. FIG. 3A, shows another prior art user interface approach with a user request pane 352 is disposed or configured to be displayed above a response pane 354.

Therefore, it is acceptable to software developers to go through these static lists, tables, illustrations, tutorials, examples, etc., before begin to code their desirable API requests or instructions.

However, the longstanding problems occur when the developers are ready to submit their requests or instructions to the APIs to determine whether the requests or instructions are valid. Many times, the developers need to complete a full and complete request or instruction before submitting, but the validation response may not provide a detailed report other than a "SUCCESS" or a "FAIL" feedback.

If the response is a "FAIL", this requires the developers to go back to the drawing board, trying to figure out which part of the their requests or instructions failed. For example, they would again review the APIs manuals or tutorials to make sure their requests or instructions have complied with the required syntax, property limitations, parameter sizes, etc. Once they confirm again that they have the right request, they will resubmit again for validation. This process will repeat itself until the validation response indicates "SUCCESS".

SUMMARY

Aspects of the invention may include a user interface for dynamically validating at least a portion of programming codes as an application program interface (API) modification request. In one embodiment, the user interface includes a graphical user interface (GUI). With the ability to validate a portion of programming codes as an application program interface (API) request, embodiments of the invention may significantly reduce the developers' time in validating the requests or instructions for the API. In addition, the validation process of aspects of the invention may be performed without requiring or being independent of a domain knowledge of the APIs under which it is validated.

BRIEF DESCRIPTION OF THE DRAWINGS

The invention may be better understood by references to the detailed description when considered in connection with the accompanying drawings. The components in the figures may not necessarily be to scale, emphasis instead being placed upon illustrating the principles of the invention. In the figures, like reference numerals designate corresponding parts throughout the different views.

Figure 1:
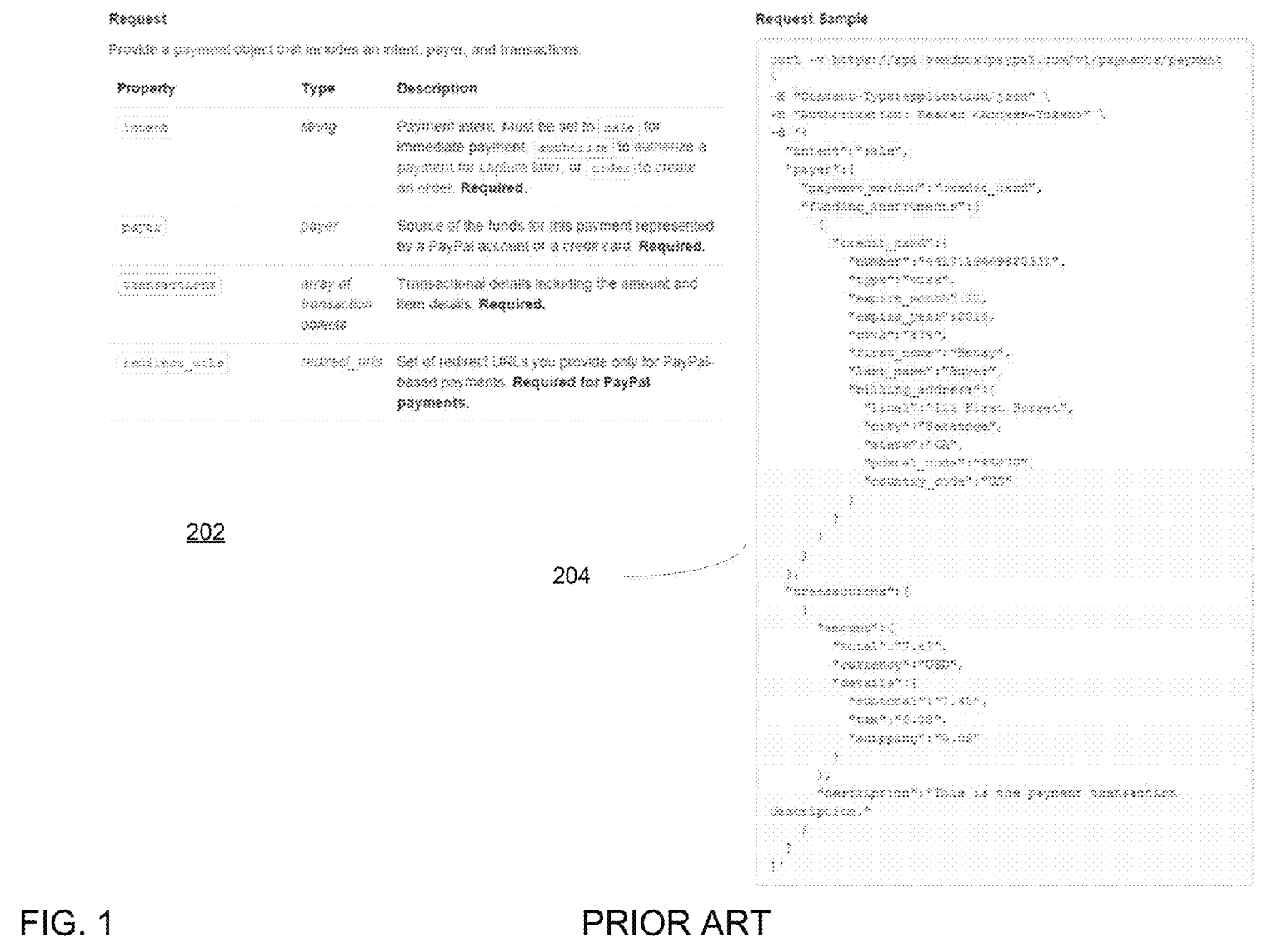
Figure 2:
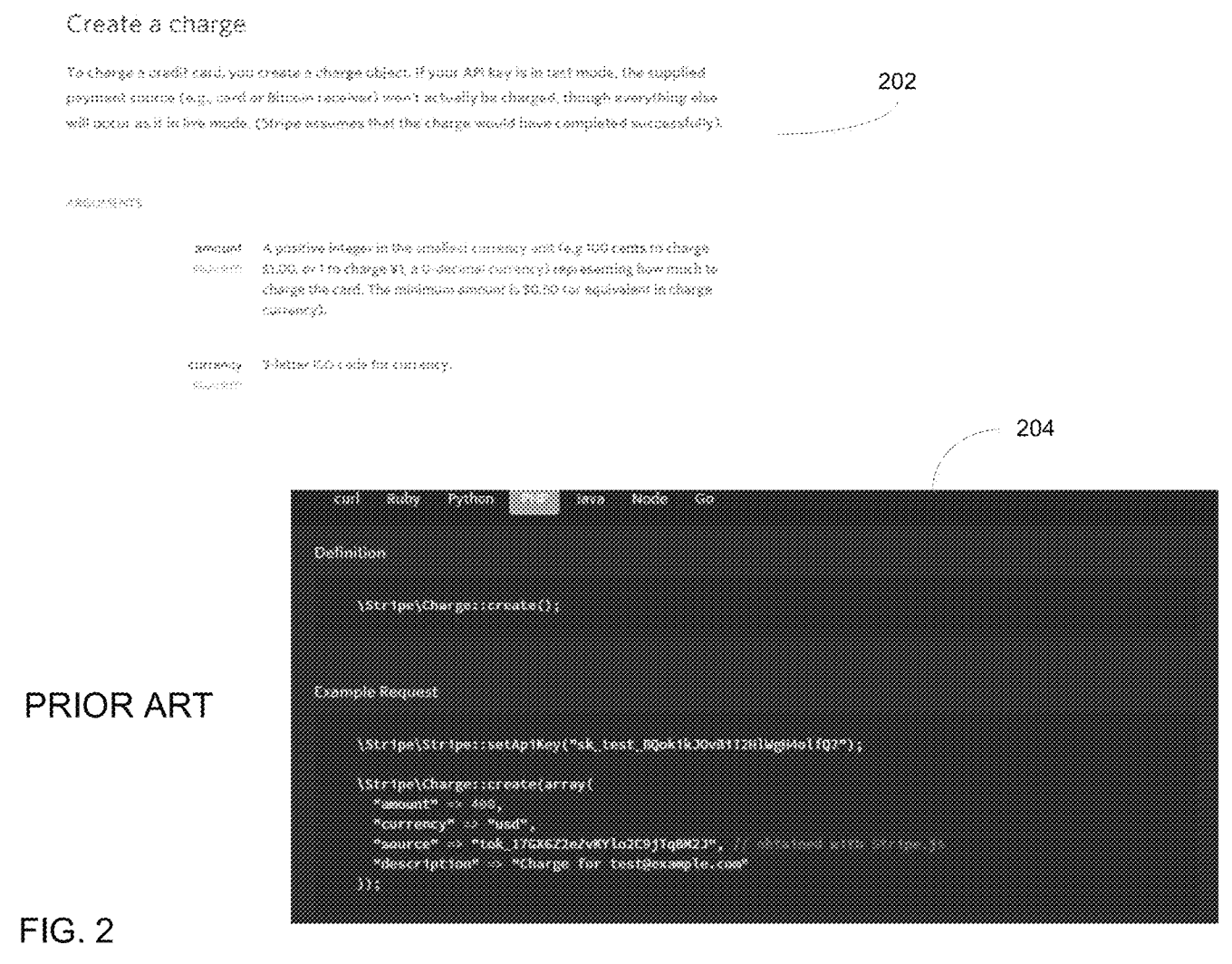

FIGS. 1, 2, and 3A illustrate prior art practices;

FIG. 3B illustrates an exemplary user interface for dynamically validating at least a portion of programming codes as an application program interface (API) request according to one embodiment of the invention;

FIG. 4 illustrates a flow chart of dynamically validating at least a portion of programming codes as an application program interface (API) request according to one embodiment of the invention;

FIG. 6 is an illustration of a server computing device suitable for aspects of the invention.

Figure 3C:
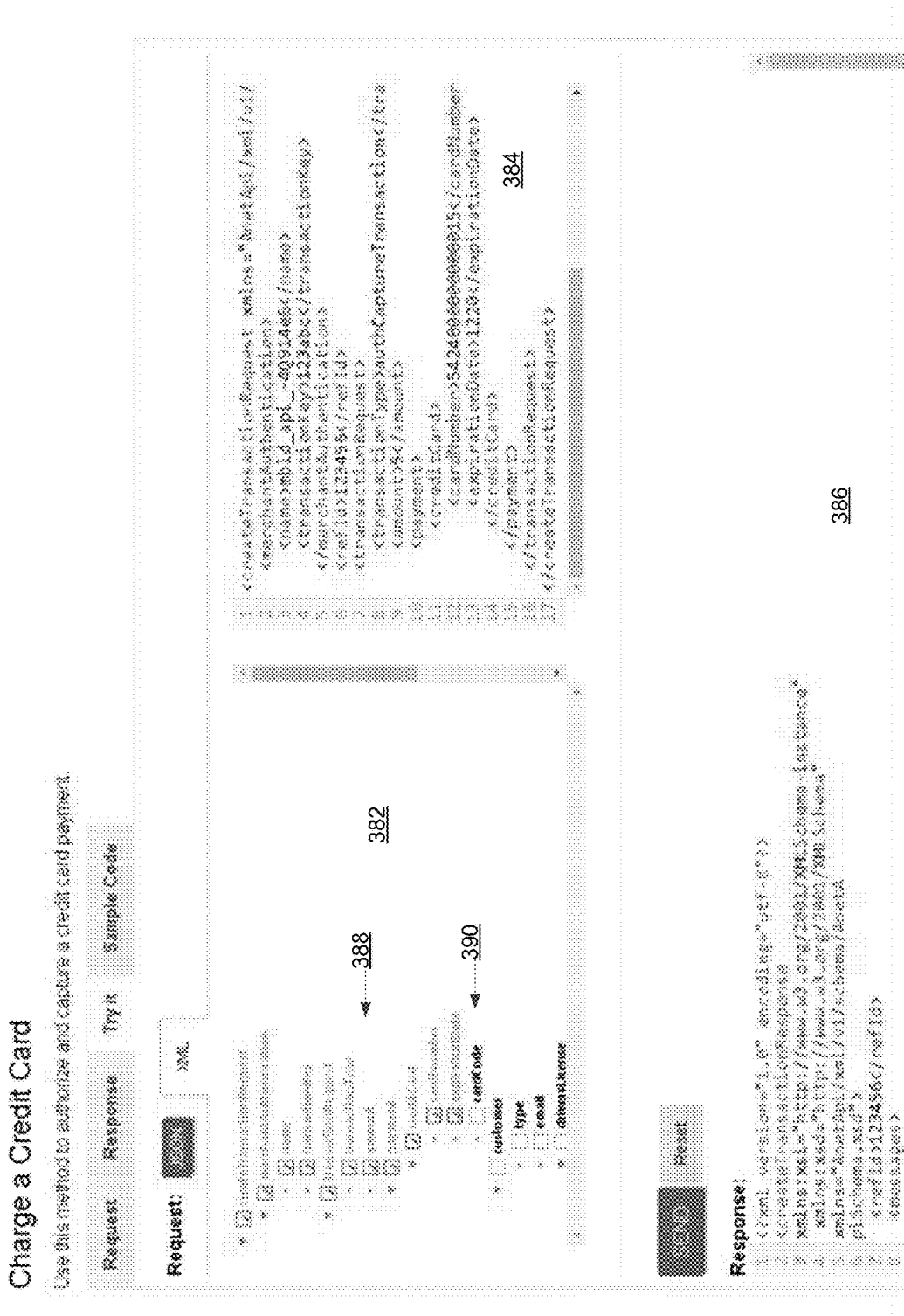
FIG. 3C illustrates another embodiment for dynamically validating at least a portion of programming codes as an application program interface (API) request according to one embodiment of the invention.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may therefore, not to be taken in a limiting sense.

Referring now to FIG. 3B, an exemplary user interface 300 for dynamically validating at least a portion of programming codes as an application program interface (API) request according to one embodiment of the invention. In one embodiment, the user interface 300 may be a graphical user interface (GUI). In the embodiment of a GUI, a user (not shown) may use a pointing device, such as a mouse to interact with the user interface 300. In another example, in the event that the user interface 300 may be displayed on a display device that is touch sensitive, the user may use the user's finger or a stylus device to interact with the display device to operate the user interface 300.

In one embodiment, the user interface 300 includes a first window area 302 and a second window area 304. In one embodiment, the first window area 302 may be further divided to a first pane 302a and a second pane 302b. It is to be understood that, depending on different preferences of design of the user interface 300, the first window area 302 may be configured into subsections without departing from the scope or spirit of the invention. For example, a design choice of separating the first window area 302 to two different window areas, instead of the first pane 302a and the second pane 302b, would be merely a design choice and would not create a functional difference.

In one example, the first window area 302 may display a plurality of data definitions associated with an API schema or structure in the first pane 302a. For example, the first pane 302a may display a list of sections within the API structure. Then, in response to a selection of one of the sections, such as a section "PAYMENT API" 314 shown in FIG. 3B, the second pane 302b may further display details the section. For illustration purposes and not as a limitation, the second pane 302b may display the following information:

```
Currency
    string = currency used for the transaction
Payment:
    cardnumber
        string = credit card number
    cardexpirationmonth
        string = two digit expiration month
    cardexpirationyear
        string = four digit expiration year
    cardtype
        string = cardtype
```

It is to be understood that the first pane 302a and/or the second pane 302b may provide scroll controls available for the user to move up and down the first pane 302a and/or the second pane 302b to view contents that may be obscured by the display device's frame.

In another embodiment, contents displayed in the first window area 302 may be static. That is the contents in the first window area 302 are all available because they are not being updated. The user may select one or more of the items listed in the first pane 302a, such as the section titled "PAYMENT API" 314, to obtain data definitions of the selection to be shown in the second pane 302b. In the current example, the "PAYMENT API" 314 includes data definitions of a number of parameters, data types for the parameters, descriptions of the parameters, etc. Unless the entire contents of the first window area 302 (e.g., API structure or user manual) receives an update, which the user may be notified, the first pane 302a and the second pane 302b may not typically change contents.

Still referring to FIG. 3B, in one embodiment, the second window area 304 may display additional information in the form of programming codes based on the first window area 302. In one example, in response to a selection of an item in the second pane 302b, a set of configurable elements 312 in programming codes format is displayed in the second window area 304. For example, in response to a selection of "CARDNUMBER" in the second pane 302b, the second window area 304 may display the configurable element 312. In the example illustrated in FIG. 3B, the user may provide an input receivable by the second window area 304 to set "4234090430233320" in the configurable element 312 in the second window area 304. In one embodiment, the programming codes shown in the second window area 304 may conform to the specification of XML, Javascript, JSON, REST API/SOAP/Web API, etc. It is to be understood that other types of programming specifications may be used without departing from the scope and spirit of the invention.

Embodiments of the invention may provide tools or user interfaces to efficiently assist software developers to better validate their requests submitted to the APIs. Each API may include an API schema (Parent/Child Node relationships), a specific data type, expiration date formats, Boolean type values (e.g., whether it is 0 or 1, true or false, yes or no), optional fields may not hidden even though they are available, or features or dependencies of data may be hidden in manual/documentation, etc. Unless the developers spend countless hours to hash out or explore all possibilities, it is very inefficient for the developers not be able to valid data in an API request while building the request.

In one embodiment, the second window area 304 may display the one or more configurable elements as a function of the selected data definitions in the first window area 302. For example, within the displayed one or more configurable elements, one or some of them may be parameters that are required or mandatory. As such, in one embodiment, those required parameters may be greyed out and are auto-populated with valid data. In another embodiment, the other optional parameters in the configurable elements may be highlighted for selection by the user to be validated in the request.

The user interface 300 may further include a dynamic request display area 306 for receiving instructions from the user to submit programming codes shown in the second window area 304. In one embodiment, the dynamic request display area 306 includes a SEND REQUEST button 308 and a RESET button 310 available for selection by the user. Moreover, the dynamic request display area 306 may also display a response shortly after the user selects SEND REQUEST. For example, if the programming codes in the second window area 304 are validated, the dynamic request display area 306 may display "SUCCESS" alert/notification almost instantly, after a brief delay, or without a substantial delay. On the other hand, if the programming codes in the second window area 304 are not validated, the dynamic request display area 306 may display "FAIL" therein. Aspects of the invention may display the response dynamically (e.g., in response to the programming codes that are submitted for validation and not the entire set of programming codes shown in the second window area 304).

In another embodiment, the user may not need to select the SEND REQUEST button 308 to submit the programming codes. For example, the user may press ENTER or RETURN on a keyboard to execute the submit action. In another embodiment, as soon as the user completes modifying the configurable elements shown in the second window area 304, the programming codes may be submitted for validation.

It is also contemplated that the user may add additional programming codes with configurable elements to the second window area 304 by selecting more data definitions in the first window area 302. However, unlike the prior art, the programming codes in the second window area 304 need not be a complete request for the API. The programming codes submitted for validation may be partially complete or an incomplete request.

Referring to yet another embodiment in FIG. 3C, a GUI 380 illustrates another aspect of the invention. The GUI 380 may include a pane 382 that may include one or more parameters or configuration settings as part of the request to the API. In one example, some of the parameters are required or mandatory as part of the request. For example, as shown in FIG. 3C, 388 may be pointed to a set of required or mandatory parameters, configuration settings or fields for the API request such that the user may not be able to control or change. FIG. 3C may use to display these settings or fields in a lighter grey color to denote such indication. It is to be understood that other display approaches may be implemented, such as putting an "*" next to the required fields or settings or providing a hovering balloon whenever a cursor controlled by the user is pointing at the fields or settings.

On the other hand, there are fields or settings that are configurable, customizable or controllable by the user. In this example, 390 is pointing to one such parameter, field or setting: "cardCode". The user may select a checkbox next to the parameter 390. Upon selecting that, a corresponding programming code may appear in a pane 384 for authentication or validation. A pane 386 may display the result of the validation or authentication. As described above, the response of the authentication or validation may be displayed real-time or dynamically in response to the selection of the SEND button.

In another embodiment, the user may be familiar with the programming language coding syntax such that the user may be comfortable to enter the codes directly in pane 484 as in FIG. 3C or in pane 304 in FIG. 3B. In such an embodiment, the corresponding one or more parameters, configuration settings or fields in the pane 382 in FIG. 3C or pane 302a or 302b in FIG. 3B will automatically be selected, highlighted, or otherwise noted to indicate that the user has selected or activated such parameters, settings or fields.

Referring now to FIG. 4, a flow chart illustrates a method for dynamically validating at least a portion of programming codes as an application program interface (API) request according to one embodiment of the invention.

In one example, the method at 402 may display a first window area on a display including static data definitions. The data definitions may include one or more configurable elements for a request to be operably submitted to an API. At 404, the method may further include receiving a selection of a first static data definitions in the first window area. In one example, the first static data definitions may include a first set of configurable elements. At 406, the method may display a second window area on the display including programming codes structured in response to the selected first static data definitions. In one example, the programming codes may be displayed with the first set of configurable elements. At 408, in one embodiment, the method may receive a first input from a user in the second window area on the display for modifying the first set of configurable elements.

At 410, the method may further receive an instruction from the user in a dynamic request display area. At 412, the method, in response to the received instruction from the user, may submit the programming codes to the API for validation. In one example, the submitted programming codes are incomplete as a transaction request for processing by the API. In other words, the submitted programming codes would not have been a complete or well-structured request for submission in the prior art. Embodiments of the invention may enable validation of a partial or a portion of the programming codes used as part of the full or complete submission. Enabling submission of this nature enable more efficient development routines for the developers. In another embodiment, the validation process of aspects of the invention may be performed without requiring or being independent of a domain knowledge of the APIs under which it is validated.

In one embodiment, with a proper domain knowledge, a user may easily design requests, routines, functions, etc., for APIs for the domain. However, without understanding the API paradoxes, the quality of such requests for the API may not be high. Embodiments of the invention may evaluate individual sets of programming codes submitted for validation, without requiring the user to have a deep domain knowledge of the API. Features of the invention may enable interns or beginners to assist other main team members of developers to quickly but also accurately develop and deploy requests for APIs.

At 414, the method further may display in the dynamic request display area a response. In one embodiment, the response may be provided without a substantial delay after the programming codes were submitted. In another embodiment, the response may be provided instantly. In a further embodiment, the response may indicate whether the submitted programming codes are valid for the API or the submitted programming codes are invalid for the API.

Figure 5:
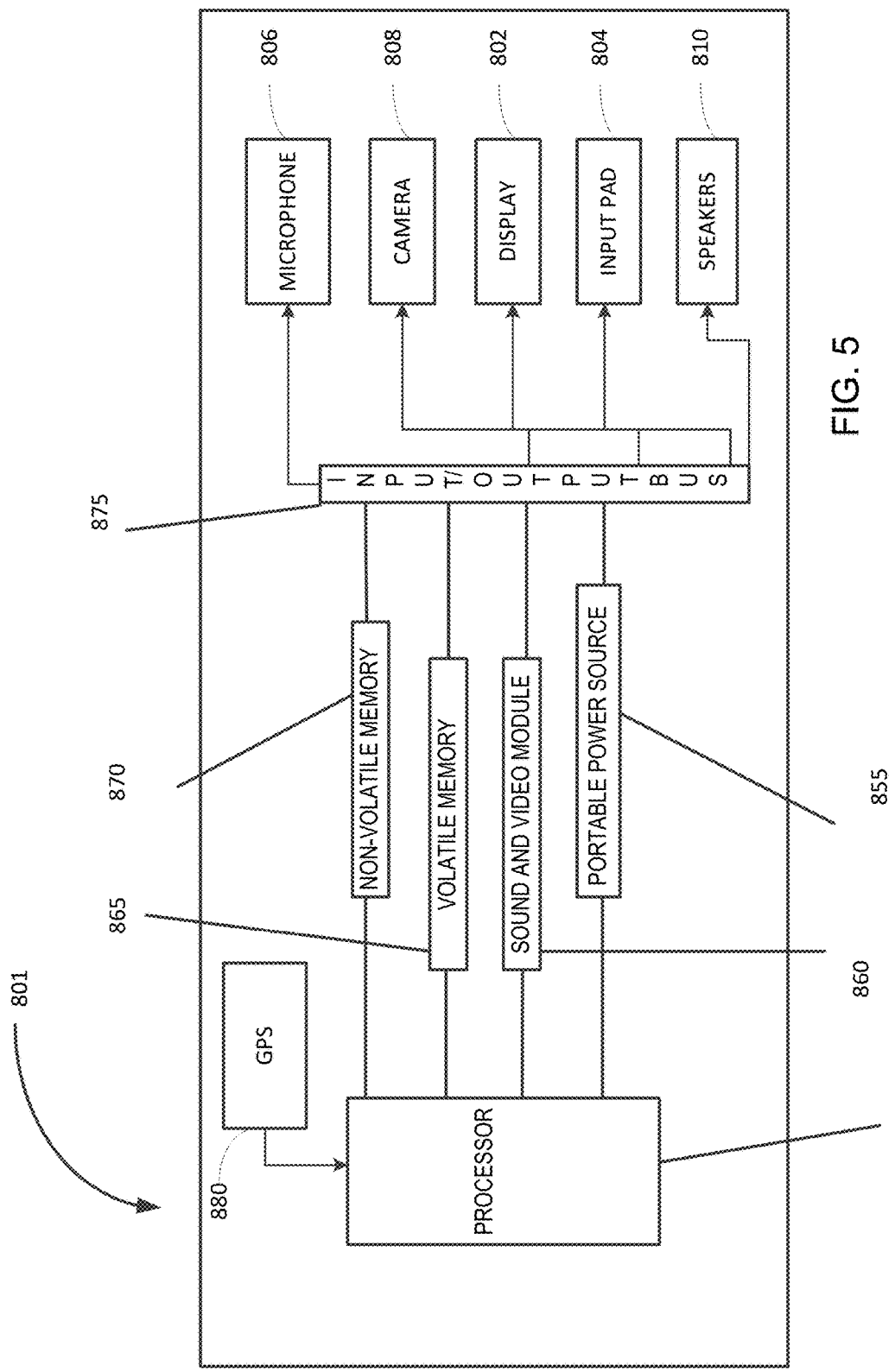
FIG. 5 is an illustration of a portable computing device suitable for aspects of the invention.

FIG. 5 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 6 may be a simplified illustration of the physical elements that make up a portable computing device 801 and FIG. 6 may be a simplified illustration of the physical elements that make up a server type computing device 841.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The claimed system and method may address several technical problems and challenges, some of which are described. Currently, entering potential sensitive data across networks makes users nervous to the point that a sale may be lost or money or time saving tips or coupons may not be received. By using a proprietary network such as a payment network, to transfer potentially sensitive data, security may be higher and users may be more open to joining additional beneficial programs. Similarly, moving data from one payment system to another loyalty system has felt risky to some users, but by using a proprietary, trusted network, the data may be communicated in a more trustworthy fashion. In addition, formatting data and communicating data in a manner which may be understood by a variety of additional programs is a technical challenge or problem which the system and method has addressed.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

In one embodiment, the remote computing device 841 and the portable computing device 801 may execute the exemplary method shown in FIG. 4.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving user graphical interface (GUI) associated with editing, composing, validating, or submitting API requests as described above. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A graphical user interface for dynamically validating at least a portion of programming codes as an application program interface (API) request comprising:
   a memory storing instructions;
   and at least one hardware processor to execute the instructions to:
   defining a first window area for displaying static data definitions for one or more configurable elements for a request to be operably submitted to an API;
   defining a second window area, being connected to the first window area, for displaying programming codes structured according to the data definitions for the request, wherein the second window area displays optional parameters of the one or more configurable elements;
   wherein the second window area is configured to receive a first input from a user to modify the optional parameters of the one or more configurable elements;
   in response to receiving the first input, defining a dynamic request display area for receiving an instruction from the user to submit the programming codes to the API for validation, wherein the submitted programming codes are incomplete in comparison to a complete transaction request for processing by the API; and
   wherein the defined dynamic request display area displays a response without a delay after the programming codes are submitted, said response indicating whether the submitted programming codes are a valid segment of the complete transaction request for the API.

2. The graphical user interface of claim 1, wherein the second window area is further configured to receive inputs from the user to add additional programming codes structured according to additional data definitions for the request.

3. The graphical user interface of claim 1, wherein the first window area is configured to receive a selection on one of the displayed data definitions via a pointing device.

4. The graphical user interface of claim 3, wherein the second window area, in response to the selection, is configured to dynamically display another set of programming codes structured according to the selected one of the displayed data definitions.

5. The graphical user interface of claim 4, wherein the second window area is configured to receive a second input from the user to modify the one or more configurable elements of the another set of programming codes, and wherein the dynamic request display area is configured to receiving another instruction from the user to submit the another set of programming codes to the API for validation, wherein the submitted programming codes are not complete as the transaction request for processing by the API.

6. The graphical user interface of claim 1, wherein the first window area is configured to display a schema for the API, said schema including one or more structured elements.

7. The graphical user interface of claim 6, wherein the first window area is configured to receive a selection of the one or more structured elements of the schema, wherein the second window area is configured to display the one or more selected structured elements for modifications by the user.

8. A computerized method for dynamically validating partial transaction requests via an application programming interface (API) comprising:
displaying a first window area of a graphical user interface (GUI) on a display including static data definitions comprising one or more configurable elements for a request to be operably submitted to an API;
receiving a selection of a first static data definitions in the first window area, said first static data definitions including a first set of configurable elements;
displaying a second window area of the GUI on the display including programming codes structured in response to the selected first static data definitions, the programming codes displaying the first set of configurable elements, wherein the first set includes optional parameters;
receiving a first input from a user in the second window area on the display for modifying the first set of configurable elements;
receiving an instruction from the user in a dynamic request display area of the GUI;
in response to the received instruction from the user, submitting the programming codes to the API for validation, wherein the submitted programming codes are incomplete comparing to a complete transaction request for processing by the API; and
displaying, in the dynamic request display area, a response without a delay after the programming codes are submitted, said response indicating whether the submitted programming codes are a valid segment of the complete transaction request for the API.

9. The computerized method of claim 8, further comprising receiving another selection of the static data definitions from the user in the first window area, and wherein displaying the second window area comprises displaying additional programming codes structured in response to the received another selection of the static data definitions in the second window area, said additional programming codes including a second set of configurable elements.

10. The computerized method of claim 9, further comprising receiving a second input from the user in the second window area on the display for modifying the second set of configurable elements.

11. The computerized method of claim 10, further comprising:
receiving a second instruction from the user in the dynamic request display area;
in response to the received second instruction from the user, submitting the additional programming codes with the modified second set of configurable elements to the API for validation, wherein the additional programming codes are incomplete as a transaction request for processing by the API; and
displaying, in the dynamic request display area, a second response without a delay after the programming codes are submitted, said response indicating whether the additional programming codes are valid for the API.

12. The computerized method of claim 8, wherein the submitted programming codes comprise the partial transaction requests for the API.

13. The computerized method of claim 8, wherein receiving the first input comprises receiving the first input via a pointing device.

14. The computerized method of claim 8, wherein the submitted programming codes comprise programming codes independent of specifying a domain knowledge of the API.

15. An electronic system for dynamically validating partial transaction requests via an application programming interface (API) comprising:
a processor is configured for executing computer executable instructions;
a memory area storing the computer executable instructions;
wherein the process is configured to execute the computer executable instructions for:
providing on a display displaying a first window area of a graphical user interface (GUI) including static data definitions comprising one or more configurable elements for a request to be operably submitted to an API;
receiving via an input interface from a user a selection of a first static data definitions in the first window area, said first static data definitions including a first set of configurable elements, wherein the first set includes optional parameters;
displaying on the display a second window area of the GUI including programming codes structured in response to the selected first static data definitions, the programming codes displaying the first set of configurable elements;
receiving via the input interface a first input from the user in the second window area for modifying the first set of configurable elements;
in response to the received first input, submitting the programming codes with the modified first set of configurable elements to the API for validation, wherein the submitted programming codes are incomplete with respect to a complete transaction request for processing by the API; and
displaying, in a dynamic request display area of the GUI on the display, a response in response to the programming codes being submitted, said response indicating whether the submitted programming codes are a valid segment of the complete transaction request for the API.

16. The electronic system of claim 15, wherein the processor is configured to execute the computer executable instructions for receiving another selection of the static data definitions from the user in the first window area, and wherein the processor is configured to display additional programming codes structured in response to the received another selection of the static data definitions in the second window area, said additional programming codes including a second set of configurable elements.

17. The electronic system of claim 16, wherein the processor is configured to receive a second input from the user in the second window area on the display for modifying the second set of configurable elements.

18. The electronic system of claim 17, wherein the processor is further configured to execute the computer executable instructions for:
in response to the received second input from the user, submitting the additional programming codes with the modified second set of configurable elements to the API for validation, wherein the additional programming codes are incomplete as a transaction request for processing by the API; and displaying in a dynamic request display area a second response after the programming codes are submitted, said response indicating whether the additional programming codes are valid for the API.

19. The electronic system of claim 15, wherein receiving the first input comprises receiving the first input via a pointing device.

20. The electronic system of claim 15, wherein the submitted programming codes comprise programming codes independent of specifying a domain knowledge of the API.

* * * * *